Figure 1:
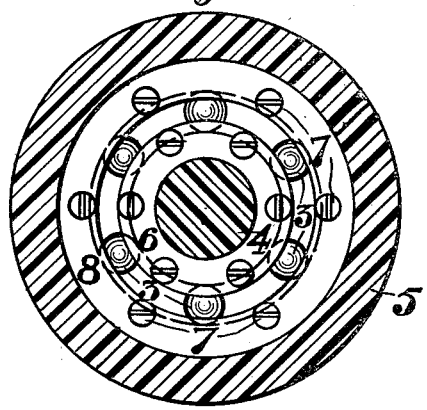

J. H. HOLMES.
SECURING WASHER.
APPLICATION FILED JULY 11, 1908.

955,160.

Patented Apr. 19, 1910.

2 SHEETS—SHEET 1.

Witnesses
Lillian Deonos
Lawrence P. Reilly

Inventor
John Henry Holmes
By Townsend & Decker
Attorneys

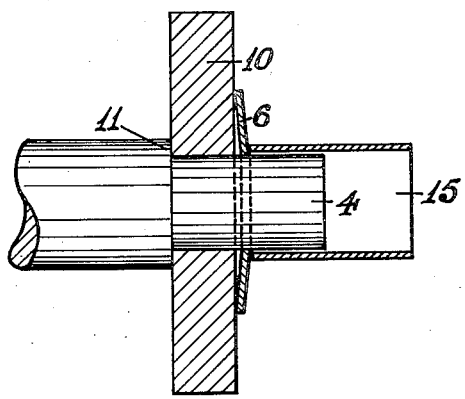
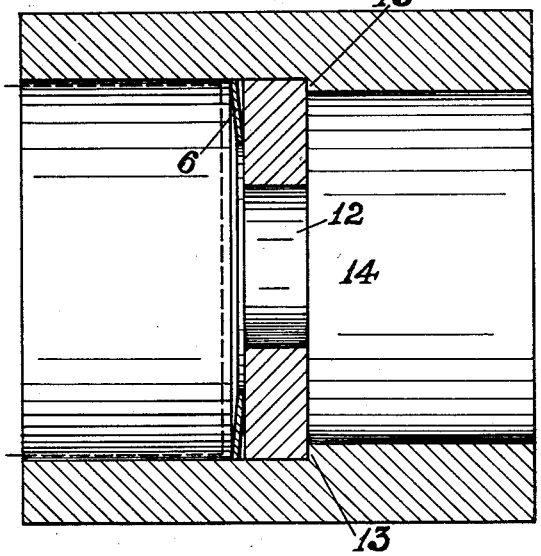

UNITED STATES PATENT OFFICE.

JOHN H. HOLMES, OF NEWCASTLE-UPON-TYNE, ENGLAND.

SECURING-WASHER.

955,160.  Specification of Letters Patent.  Patented Apr. 19, 1910.

Application filed July 11, 1908. Serial No. 443,095.

*To all whom it may concern:*

Be it known that I, JOHN H. HOLMES, a subject of the King of Great Britain and Ireland, residing at Newcastle-upon-Tyne, in the county of Northumberland, England, have invented new and useful Improvements in Securing-Washers, of which the following is a specification.

This invention relates to means for fixing or securing a member or part to, in or in its carrying or supporting body, and has for objects to provide means which shall be cheaper in construction, simpler in character and as efficient in action as those heretofore proposed.

After a perusal of the following description and an inspection of the drawings, which latter are purely diagrammatic and illustrative, it will be apparent that the objects mentioned above have been, or will be, achieved.

For convenience of description and of illustration, two simple applications of the improvements have been taken; these comprise (a) the fixing or securing of a ring or collar to or on a shaft or the like and (b) the fixing or securing of a ring or plug within a hole or chamber.

In all the applications or uses in or to which improved means in accordance with the present invention may be applied, it is essential that the part of the carrying or supporting body to, in or on which the member or part is to be fixed or secured, have parallel sides or walls, and that the face or edge of the means that co-acts, as hereinafter described, with the said parallel sides or walls be bored, turned, ground or otherwise worked upon so as, when inoperative, to be cylindrical and to fit closely said parallel sides or walls.

The invention has reference, in particular, to fixing or securing means of the class in which the member or part is fixed or secured to, in or on the carrying or supporting body by means of washers of dished or coned formation, the fixing or securing being effected by flattening, more or less, the dished or coned washer and forcing a face or edge thereof into frictional engagement with the carrying or supporting body. According to the present invention, the dished or coned washer is thin and plain and has its inner or outer peripheral face or edge, as the case may be, made cylindrical and to fit closely the carrying or supporting body, the construction and arrangement being such that, when the washer is flattened, the inner or outer peripheral face or edge tends to become coned or tapered, such coning or tapering causing an alteration in the length of the inner or outer peripheral face or edge and thereby effecting the engagement or frictional grip of the washer with, and the fixing or securing of the member or part to, in or on the carrying or supporting body.

Figure 2:
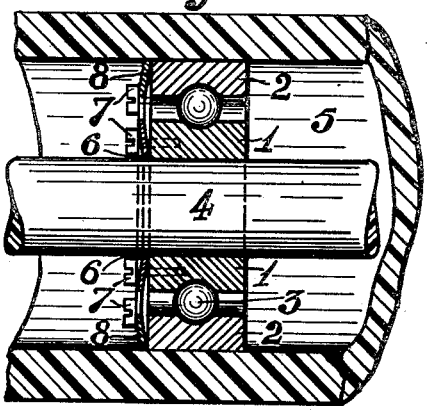
Figure 3:
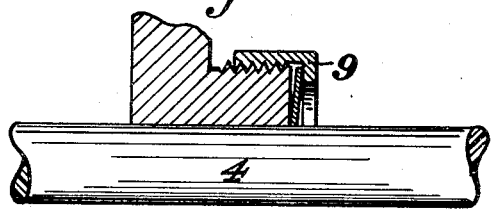
Figure 4:
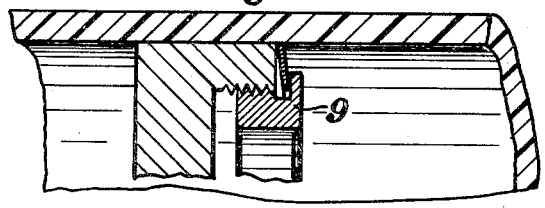

Referring now to the accompanying drawings:—Figures 1 and 2 are, respectively, an end elevation, partly in section, and a cross section showing the application of the invention to a well known form of single row ball bearing. Figs. 3 and 4 are cross sectional views of modifications hereinafter described. Figs. 5 and 6 are similar views to Figs. 3 and 4, but of a further modification.

In Figs. 1 and 2, which are purely diagrammatic and illustrative, as also are Figs. 3 to 6, the embodiment contains the two simple applications of the invention mentioned above, in use in connection with one and the same piece of mechanism, if the two ball races be regarded as rings.

The single row ball bearing comprises two hardened steel ball races, 1, 2 of ordinary construction with a number of hardened steel balls 3 disposed between them. The usual cage or device for keeping the balls in their proper relative positions is omitted from the drawings for the sake of clearness. The inner ball race 1 is fixed or secured, as hereinafter described, to, and revolves with, the shaft 4, while the outer ball race 2 is fixed or secured, as hereinafter described, in a bored chamber 5 in a bearing pedestal and forms a stationary path for the balls. The inner ball race 1 is fixed or secured to the shaft 4 by the washer 6; this washer 6 is made of elastic steel of uniform thickness and fairly thin and is of dished or conical shape and such that a section through an axial plane shows two parallelograms. The washer thus presents on one side a portion of the surface of a very low external cone and on the other side a corresponding surface of an internal cone. The hole through the washer is bored, turned, ground, or otherwise worked upon so that this face or edge, when the washer is inoperative, is cylindrical and fits closely the shaft 4. The washer is attached to a side wall of the ball race 1 by screws 7, which pass through plain clearance holes near the outer periphery of the washer and enter tapped holes in the ball race 1. The washer 6 is placed with its convex side next to the ball race, and the ball race is fixed or secured to the shaft, after its longitudinal position has been located, by tightening up uniformly the screws 7. This tightening up of the screws 7 causes the washer to be flattened and to lose its dished or conical shape and forces what was the convex side thereof into close contact with the side wall of the ball race. The flattening of the washer tends to cause the hole therethrough to become coned or tapered and appreciably smaller in diameter toward the convex side of the washer, thus effecting a frictional grip upon the shaft. The shaft is thus tightly gripped and the ball race is prevented from being shifted upon the shaft by any force that is likely to be brought to bear upon it in ordinary use.

In fixing the ball race 2 in the hole or chamber 5 bored to fit the exterior turned surface of the ball race, use is made of a washer 8, similar to that just described above, but in this arrangement, instead of the hole through the washer being trued up as described, the outer periphery is turned, ground or otherwise worked upon so that its face or edge is cylindrical and a close fit in the hole or chamber, and the washer is placed with its concave side next to a side wall of the ball race and the plain clearance holes for the screws are drilled near to the edge of the hole through the washer instead of near its outer periphery. When the screws are tightened up uniformly so as to flatten the washer and cause it to lose its dished or conical shape, the outer peripheral face or edge tends to become coned or tapered instead of cylindrical and appreciably larger in diameter toward the concave side of the washer, thus effecting a frictional grip upon the hole or chamber. The walls of the hole or chamber are thus strongly engaged by the washer and the ball race is held in position. If a more effectual grip be required than results from the use of a single washer, a second washer may be added and attached to the other side wall of the ball race. This second washer may be flattened out by its own set of flattening screws, or if bolts be employed in lieu of screws, these may pass through clearance holes in the ball races and through both washers, which are then flattened out simultaneously by screwing up the nuts.

It will be obvious that instead of using screws or bolts for flattening out the washer, it will be possible to arrive at the same end by other means. For instance, Fig. 3 shows an arrangement in which a collar is fixed or secured to the shaft 4 by means of a nut 9, which is screwed upon the collar and which flattens out the washer and causes it to grip the shaft. Fig. 4 shows this arrangement applied to a plug or ring within a bored hole or chamber.

In the two arrangements illustrated in Figs. 5 and 6, the means which attach the washer to the member or part and which also serve to flatten the washer and cause it to engage or grip frictionally the carrying or supporting body are dispensed with. The washer is flattened and thus caused to engage or grip frictionally the carrying or supporting body by means which will be hereinafter mentioned. In Fig. 5, the washer 6 is illustrated as holding a ring 10 against a shoulder 11 or an abutment on the shaft 4, and in Fig. 6, the washer is shown holding a ring 12 against a shoulder 13 or abutment within the chamber 14. In these two arrangements it will be noticed that the disposition of the washer relatively to the member or part is the reverse of those illustrated in Figs. 2 to 4 inclusive. In Figs. 2, 3 and 5 the member or part is to be fixed or secured to or on a shaft but in the arrangements illustrated in Figs. 2 and 3 the washer is placed with its convex side next to the member or part, and in Fig. 5 with its concave side next the member or part. In Figs. 2 and 4 the concave side of the washer is placed next the member or part and in Fig. 6 the convex side is so placed. This alteration of the disposition of the washer relatively to the member or part is rendered necessary by the omission of the combined attaching and flattening means. The washer 6 is flattened by pressure applied to the face thereof all around and adjacent the operative face or edge. With the arrangement illustrated in Fig. 5 such pressure is conveniently applied by means of a tube 15, which is slipped on to the shaft 4 and one end thereof brought into contact with the face of the washer adjacent the operative face or edge. The tube 15 is of such length that the other end thereof extends beyond the end of the shaft 4; pressure is applied to this projecting end and transmitted by the tube to the washer which is flattened. The operative face or edge is thus caused to become coned or tapered and the hole through the washer appreciably smaller in diameter toward the convex side, thus effecting a frictional grip upon the shaft. With the arrangement illustrated in Fig. 6, the pressure is applied by means of a tool or device that is brought into contact with the face of the washer adjacent the operative face or edge.

It has been found from experiment that the dishing or coning of the washer need not be great, and should not exceed 15°; good results in practice have been obtained when the washer has been dished or coned to about 5° or 6°. It is essential, as has already been pointed out, that the operative face or edge of the washer be bored, turned, ground or otherwise worked upon so as to be truly cylindrical when inoperative, and fit closely the part of the body with which it is to co-act.

The construction of washer described is preferred, but it will be apparent that in some instances it may be convenient to have the longer sides of the parallelograms shown in a section of the washer through an axial plane curved instead of straight.

It is found that the grip exerted by the washer upon the body is sufficient to prevent longitudinal or endwise relative movement between the member or part and the body, unless an abnormal force be applied to bring about such a movement. The invention has not for object the fixing or securing of a member or part to, in or on a body so as to transmit from one to the other any large force tending to cause rotative relative movement, although in many cases, such for example, as the ball bearing described above, the grip exerted by the washer will be amply sufficient to deal with the rotative forces which it will have to meet. In special cases, an ordinary key partially sunk in the member or part and in the body may be employed to supplement the grip exerted by the washer or washers and thus deal satisfactorily with comparatively heavy rotative forces.

Although in the foregoing description the invention has been described in connection with the fixing or securing of a member or part to, in or on a carrying or supporting body of cylindrical form, it will be obvious that the invention is not limited to a body of such form, but is applicable in connection with bodies whose walls or sides are parallel.

What I claim is:—

1. In a device of the class described, the combination with the carrying or supporting body and the member or part that is to be fixed or secured thereto, of a thin plain dished washer having a peripheral face or edge that is parallel with and fits closely the carrying or supporting body, and means for flattening said washer so as to cause said peripheral face or edge to become coned or tapered and engage or grip frictionally the carrying or supporting body.

2. In a device of the class described, the combination with the carrying or supporting body and the member or part that is to be fixed or secured thereto, of a thin plain dished washer having a peripheral face or edge that is parallel with and fits closely the carrying or supporting body, means for attaching said washer to said member or part and for flattening said washer, so as to cause said peripheral face or edge to become coned or tapered and to engage or grip frictionally said carrying or supporting body.

3. In a device of the class described, the combination with the carrying or supporting body and the member or part that is to be fixed or secured thereto, of a thin plain dished washer having a peripheral face or edge that is parallel with and fits closely the carrying or supporting body, means for attaching said washer to said member or part and passing through the washer remote from said peripheral face or edge, said means also acting to flatten said washer and cause said peripheral face or edge to become coned or tapered and to engage frictionally said carrying or supporting body.

4. In a device of the class described, the combination with the carrying or supporting body and the member or part that is to be fixed or secured thereto, of a thin plain dished washer having a peripheral face or edge that is parallel with and fits closely the carrying or supporting body, holes formed through said washer remote from said peripheral face or edge, screws passing through said holes into the member or part and attaching the washer thereto and also acting to flatten said washer and cause said peripheral face or edge to become coned or tapered and to engage or grip frictionally said carrying or supporting body.

Dated this 29th day of June, 1908.

JOHN H. HOLMES.

Witnesses:
H. NIXON,
ALLEN CROWE.